(12) United States Patent
Tachi

(10) Patent No.: US 9,854,116 B2
(45) Date of Patent: Dec. 26, 2017

(54) IMAGE PROCESSING APPARATUS CONFIGURED TO TRANSMIT IMAGE DATA AND METHOD FOR CONTROLLING AN IMAGE PROCESSING APPARATUS

(71) Applicant: CANON KABUSHIKI KAISHA, Tokyo (JP)

(72) Inventor: Daiki Tachi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/692,608

(22) Filed: Apr. 21, 2015

(65) Prior Publication Data

US 2015/0229796 A1 Aug. 13, 2015

Related U.S. Application Data

(63) Continuation of application No. 13/830,416, filed on Mar. 14, 2013, now Pat. No. 9,036,177.

(30) Foreign Application Priority Data

Mar. 22, 2012 (JP) ................................. 2012-065843

(51) Int. Cl.
*H04N 1/00* (2006.01)
*H04N 1/32* (2006.01)
*H04N 1/44* (2006.01)

(52) U.S. Cl.
CPC ..... *H04N 1/00854* (2013.01); *H04N 1/00114* (2013.01); *H04N 1/00501* (2013.01); *H04N 1/00875* (2013.01); *H04N 1/3209* (2013.01); *H04N 1/4413* (2013.01); *H04N 1/4433* (2013.01)

(58) Field of Classification Search
None
See application file for complete search history.

(56) References Cited

U.S. PATENT DOCUMENTS

| 7,689,596 B2* | 3/2010 | Tsunoda | H04N 1/00477 |
| | | | 358/1.15 |
| 7,782,476 B2* | 8/2010 | Suehiro | H04N 1/00212 |
| | | | 358/1.15 |
| 2006/0190496 A1 | 8/2006 | Tsunoda | |
| 2008/0104519 A1 | 5/2008 | Maekawa | |
| 2009/0100525 A1 | 4/2009 | Uchikawa | |
| 2012/0060122 A1* | 3/2012 | Tanaka | G03G 15/5087 |
| | | | 715/825 |

FOREIGN PATENT DOCUMENTS

| CN | 1893505 A | 1/2007 |
| CN | 102238172 A | 11/2011 |
| WO | 02/059713 A2 | 8/2002 |

\* cited by examiner

*Primary Examiner* — Paul F Payer
(74) *Attorney, Agent, or Firm* — Canon U.S.A. Inc., IP Division

(57) ABSTRACT

An image processing apparatus includes a registration unit configured to register a destination of file transmission, a selection unit configured to select whether to require a user to input, at time of transmission, authentication information required for the file transmission for each destination registered by the registration unit, a transfer unit configured to transfer received image data, and a control unit configured to prevent a destination for which it is selected to require the user to input the authentication information at time of transmission from being set as a transfer destination of the image data.

5 Claims, 18 Drawing Sheets

FIG. 4

```
NEW DESTINATION REGISTRATION

■ NAME              [ Suzuki          ]~401
■ PROTOCOL          [ SMB         ▼ ]~402
■ HOST NAME         [ server.abc.co.jp ]~403
■ PATH              [ /def/gfi         ]~404
■ USER NAME         [ user1            ]~405
■ PASSWORD          [ password1        ]~406
■ INPUT REQUIRED    [ ON  ]~407  [ OFF ]~408
  AT TRANSMISSION
```

FIG. 5

DESTINATION MANAGEMENT TABLE 500

| DESTINATION ID 501 | NAME 502 | PROTOCOL 503 | HOST NAME 504 | PATH 505 | USER NAME 506 | PASSWORD 507 | INPUT REQUIRED AT TRANSMISSION 508 |
|---|---|---|---|---|---|---|---|
| 001 | Suzuki | SMB | server.abc.co.jp | /def/ghi | user1 | password1 | OFF |
| 002 | Tanaka | FTP | server.111.co.jp | /111/222 | user2 | password2 | ON |
| 003 | Sato | FTP | server.xyz.co.jp | /111/333 | user3 | password3 | OFF |
| 004 | Kato | SMB | server.abc.co.jp | /def/abc | user4 | password4 | OFF |
| 005 | Yamada | WebDAV | server.abc.co.jp | /def/xyz | user5 | password5 | ON |

FIG. 7

```
┌─────────────────────────────────────────────────────┐
│ AUTHENTICATION INFORMATION INPUT                    │
│ ┌─────────────────────────────────────────────────┐ │
│ │                                                 │ │
│ │  ■ PROTOCOL    [////SMB/////]~701               │ │
│ │                                                 │ │
│ │  ■ HOST NAME   [//server.abc.co.jp//]~702       │ │
│ │                                                 │ │
│ │  ■ PATH        [//////def/gfi//////]~703        │ │
│ │                                                 │ │
│ │  ■ USER NAME   [                    ]~704       │ │
│ │                                                 │ │
│ │  ■ PASSWORD    [                    ]~705       │ │
│ │                                                 │ │
│ └─────────────────────────────────────────────────┘ │
└─────────────────────────────────────────────────────┘
```

FIG. 8

```
┌─────────────────────────────────────────────────────┐
│ NEW TRANSFER SETTING REGISTRATION                   │
├─────────────────────────────────────────────────────┤
│  ■ RECEIVING      ┌──────────┐                      │
│    METHOD         │  FAX   ▼ │~801                  │
│                   └──────────┘                      │
│  ■ RECEIVING      ┌─────────────────────────────┐   │
│    CONDITION      │ RECEIVED FROM 03-1234-5678  │~802│
│                   └─────────────────────────────┘   │
│  ■ TRANSFER       ┌─────────────────────────────┐   │
│    DESTINATION    │                             │~803│
│                   └─────────────────────────────┘   │
│  ■ ENABLED/       ┌─────────┐                       │
│    DISABLED       │ ENABLED │~804                   │
│                   └─────────┘                       │
└─────────────────────────────────────────────────────┘
```

FIG. 11

TRANSFER SETTING MANAGEMENT TABLE 1100

| TRANSFER SETTING ID 1101 | RECEIVING METHOD 1102 | RECEIVING CONDITION 1103 | TRANSFER DESTINATION 1104 | ENABLED/DISABLED 1105 |
|---|---|---|---|---|
| 001 | FAX | RECEIVED FROM 03-1234-5678 | Suzuki | ENABLED |
| 002 | IFAX | RECEIVED FROM aaa@bbb.co.jp | Suzuki | ENABLED |
| 003 | IFAX | RECEIVED FROM ccc@ddd.co.jp | Kato | DISABLED |
| 004 | FAX | RECEIVED FROM 03-1111-1111 | Suzuki | ENABLED |
| 005 | FAX | RECEIVED FROM 03-2222-2222 | Kato | DISABLED |

FIG. 13

DESTINATION MANAGEMENT TABLE 1300

| DESTINATION ID 501 | NAME 502 | PROTOCOL 503 | HOST NAME 504 | PATH 505 | USER NAME 506 | PASSWORD 507 | INPUT REQUIRED AT TRANSMISSION 508 | NUMBER OF REFERENCES MADE BY TRANSFER SETTING 1301 |
|---|---|---|---|---|---|---|---|---|
| 001 | Suzuki | SMB | server.abc.co.jp | /def/gfi | user1 | password1 | OFF | 3 |
| 002 | Tanaka | FTP | server.111.co.jp | /111/222 | user2 | password2 | ON | 0 |
| 003 | Sato | FTP | server.xyz.co.jp | /111/333 | user3 | password3 | OFF | 0 |
| 004 | Kato | SMB | server.abc.co.jp | /def/abc | user4 | password4 | OFF | 2 |
| 005 | Yamada | WebDAV | server.abc.co.jp | /def/xyz | user5 | password5 | ON | 0 |

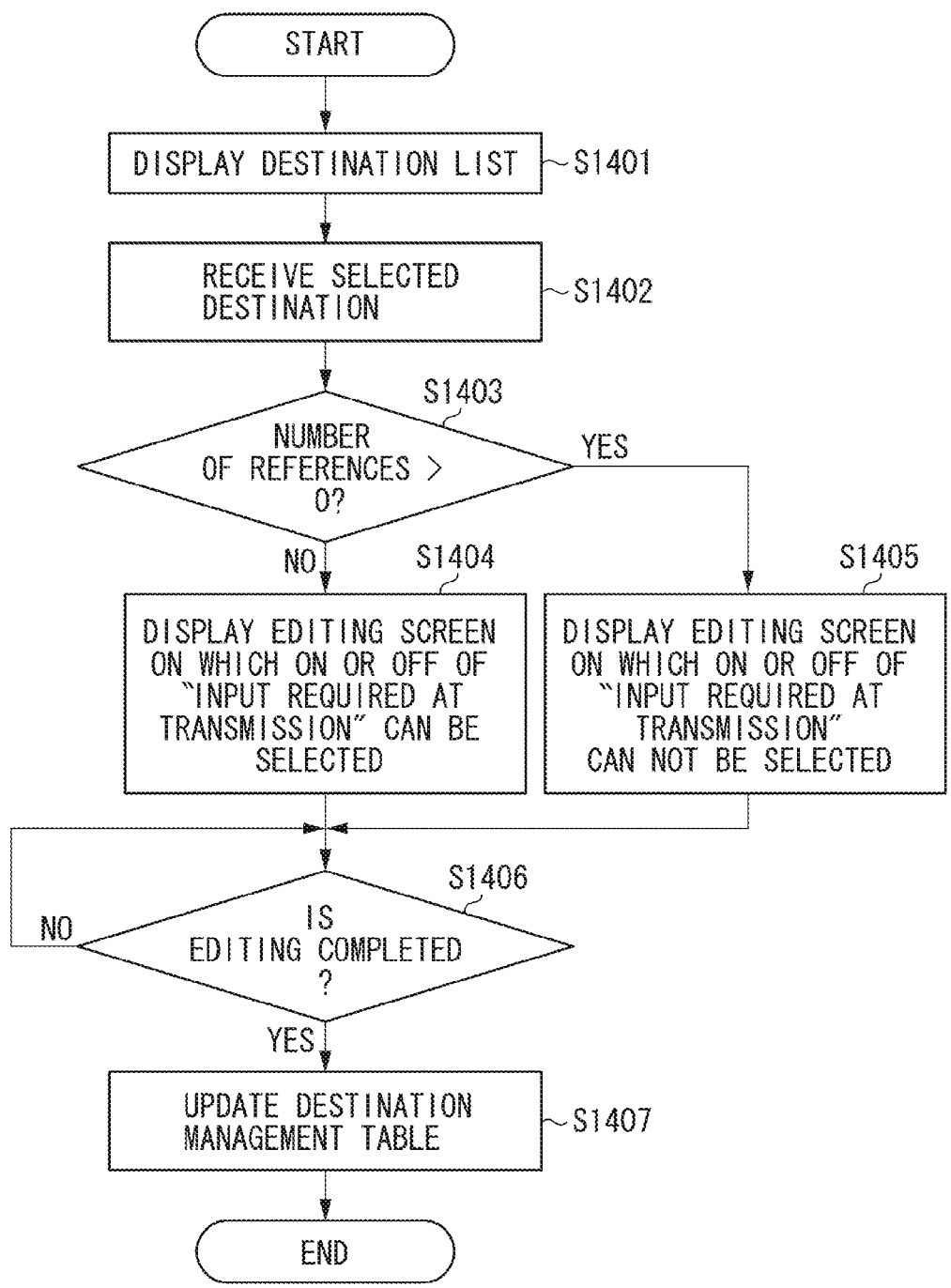

FIG. 15

| DESTINATION EDITING | | |
|---|---|---|
| ■ NAME | Suzuki | ~1501 |
| ■ PROTOCOL | SMB ▼ | ~1502 |
| ■ HOST NAME | server.abc.co.jp | ~1503 |
| ■ PATH | /def/gfi | ~1504 |
| ■ USER NAME | user1 | ~1505 |
| ■ PASSWORD | password1 | ~1506 |
| ■ INPUT REQUIRED AT TRANSMISSION | ON ~1507 | OFF ~1508 |

FIG. 16

```
DESTINATION EDITING

■ NAME           [ Suzuki          ]~1501
■ PROTOCOL       [ SMB          ▼ ]~1502
■ HOST NAME      [ server.abc.co.jp ]~1503
■ PATH           [ /def/gfi        ]~1504
■ USER NAME      [ user1           ]~1505
■ PASSWORD       [ password1       ]~1506
■ INPUT REQUIRED
  AT TRANSMISSION              [//OFF//]~1508
```

FIG. 17

DESTINATION MANAGEMENT TABLE 1700

| DESTINATION ID 501 | NAME 502 | PROTOCOL 503 | HOST NAME 504 | PATH 505 | USER NAME 506 | PASSWORD 507 | INPUT REQUIRED AT TRANSMISSION 508 | TRANSFER SETTING ID 1701 |
|---|---|---|---|---|---|---|---|---|
| 001 | Suzuki | SMB | server.abc.co.jp | /def/gfi | user1 | password1 | OFF | 001,002,004 |
| 002 | Tanaka | FTP | server.111.co.jp | /111/222 | user2 | password2 | ON | |
| 003 | Sato | FTP | server.xyz.co.jp | /111/333 | user3 | password3 | OFF | |
| 004 | Kato | SMB | server.abc.co.jp | /def/abc | user4 | password4 | OFF | 003,005 |
| 005 | Yamada | WebDAV | server.abc.co.jp | /def/xyz | user5 | password5 | ON | |

IMAGE PROCESSING APPARATUS CONFIGURED TO TRANSMIT IMAGE DATA AND METHOD FOR CONTROLLING AN IMAGE PROCESSING APPARATUS

CROSS-REFERENCE TO RELATED APPLICATIONS

The present application is a Continuation application of U.S. patent application Ser. No. 13/830,416 filed on Mar. 14, 2013 which claims priority from Japanese Patent Application No. 2012-065843 filed Mar. 22, 2012, all of which are hereby incorporated by reference herein in its entirety.

BACKGROUND OF THE INVENTION

Field of the Invention

The present invention relates to an image processing apparatus configured to transmit image data.

Description of the Related Art

Conventionally, it is known that an image processing apparatus receives image data, and automatically transfers the received image data to a previously-set transfer destination. Facsimile and I facsimile (Internet facsimile) are known as a method for receiving image data. File transmission, in addition to the facsimile, the I facsimile, and e-mail, is known as a method for transferring image data. The file transmission means the transmission of image data by a transmission protocol such as the Server Message Block (SMB) protocol or the File Transfer Protocol (FTP).

In order to perform the file transmission of image data, in addition to a host name indicating a destination apparatus and path information of a folder as a storage destination of the image data, authentication information (a user name and a password) for accessing the destination apparatus is required.

When setting for transferring the image data by the file transmission is performed, it takes time and effort to input the above-mentioned various types of information. To solve the problem, Japanese Patent Application Laid-Open No. 2003-323330 discusses transfer setting performed with reference to destination information of file transmission previously-registered in an image processing apparatus, thereby reducing user's time and effort during the transfer setting.

In recent years, it has also been considered that a destination of file transmission registered in an address book is selected to instruct transmission execution (press a start button), and then, a screen for inputting authentication information (a user name and a password) is displayed. When a user inputs the authentication information via this screen, an image processing apparatus, using the input authentication information, is connected to the destination apparatus, and then, image data is transmitted. Thus, the unauthorized use of the authentication information (the abuse of the authentication information registered by another user) can be prevented by causing the user who has instructed the transmission to input the authentication information.

Furthermore, it is known that ON/OFF of "Input required at transmission" is set when a destination of file transmission is registered in an address book of an image processing apparatus. When "Input required at transmission" is set to ON, after the destination is selected to instruct transmission execution (press a start button), the above-mentioned screen is displayed, and the input of authentication information is required. On the other hand, when "Input required at transmission" is set to OFF, the image processing apparatus, using the authentication information registered in the address book, is connected to the apparatus of the destination without the above-mentioned screen being displayed, and then, image data is transmitted.

However, when the destination for which "Input required at transmission" is set to ON is set as the transfer destination of image data, the following problem is caused. Because the transfer of image data is automatically executed when the image data is received, the user is not necessarily present in front of the image processing apparatus. However, when "Input required at transmission" of the destination set as the transfer destination is set to ON, the screen for inputting the authentication information is displayed, and is left suspended in a state where the transfer is not performed until the user operates the screen.

SUMMARY OF THE INVENTION

The present invention is directed to an image processing apparatus that prevents a destination selected as a destination for which a user inputs authentication information required to perform file transmission from being set as a transfer destination of image data.

According to an aspect of the present invention, an image processing apparatus includes a registration unit configured to register a destination of file transmission, a selection unit configured to select whether to require a user to input, at time of transmission, authentication information required for the file transmission for each destination registered by the registration unit, a transfer unit configured to transfer received image data, and a control unit configured to prevent a destination for which it is selected to require the user to input the authentication information at time of transmission from being set as a transfer destination of the image data.

According to another aspect of the present invention, an image processing apparatus includes a registration unit configured to register a destination of file transmission, a selection unit configured to select whether to require a user to input, at time of transmission, authentication information required for the file transmission for each destination registered by the registration unit, a transfer unit configured to transfer received image data, and a control unit configured to inhibit a destination set as a transfer destination of the image data from being changed from a state where it is selected not to require the user to input the authentication information at time of transmission to a state where it is selected to require the user input the authentication information at time of transmission.

According to yet another aspect of the present invention, an image processing apparatus includes a registration unit configured to register a destination of file transmission, a selection unit configured to select whether to require a user to input, at time of transmission, authentication information required for the file transmission for each destination registered by the registration unit, a transfer unit configured to transfer received image data, and a control unit configured to disable, if a destination set as a transfer destination of the image data is changed from a state where it is selected not to require the user to input the authentication information at time of transmission to a state where it is selected to require the user to input the authentication information at time of transmission, transfer setting of the image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an operation screen of the MFP according to the first exemplary embodiment.

FIG. 5 illustrates a destination management table according to the first exemplary embodiment.

FIG. 7 illustrates an operation screen of the MFP according to the first exemplary embodiment.

FIG. 8 illustrates an operation screen of the MFP according to the first exemplary embodiment.

FIG. 11 illustrates a transfer setting management table according to the first exemplary embodiment.

FIG. 13 illustrates a destination management table according to a second exemplary embodiment of the present invention.

FIG. 14 is a flow chart illustrating an operation of an MFP according to the second exemplary embodiment.

FIG. 15 illustrates an operation screen of the MFP according to the second exemplary embodiment.

FIG. 16 illustrates an operation screen of the MFP according to the second exemplary embodiment.

FIG. 17 illustrates a destination management table according to a third exemplary embodiment of the present invention.

DESCRIPTION OF THE EMBODIMENTS

Various exemplary embodiments, features, and aspects of the invention will be described in detail below with reference to the drawings.

Figure 1:
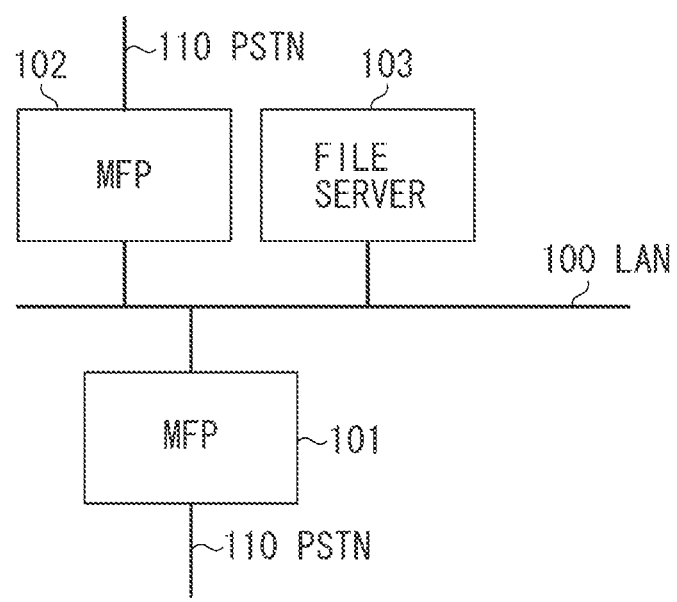
FIG. 1 is an overall diagram of an image processing system according to a first exemplary embodiment of the present invention.

First, a first exemplary embodiment of the present invention will be described. FIG. 1 is an overall diagram of an image processing system. MFPs 101 and 102 and a file server 103 are connected to be able to communicate with each other on a local area network (LAN) 100. The MFPs 101 and 102 are an example of an image processing apparatus. The file server 103 is an example of a file management apparatus.

The MFPs 101 and 102 can perform file transmission of image data, using an SMB or an FTP, to a folder in the file server 103 as a destination. In addition to a folder in the file server 103, a folder in a client personal computer (PC) which is not illustrated can be used as the destination. The MFPs 101 and 102 can transmit and receive the image data by an e-mail via a mail server which is not illustrated. The MFPs 101 and 102 are connected to a public switched telephone network (PSTN) 110, and facsimile transmission and reception can be performed between the MFPs 101 and 102 or between the MFPs 101 and 102 and a facsimile machine which is not illustrated.

Although the image processing system includes the MFPs 101 and 102 and the file server 103, only the MFP 101 and the file server 103, or only the MFP 101 may be referred to as the image processing system.

Figure 2:
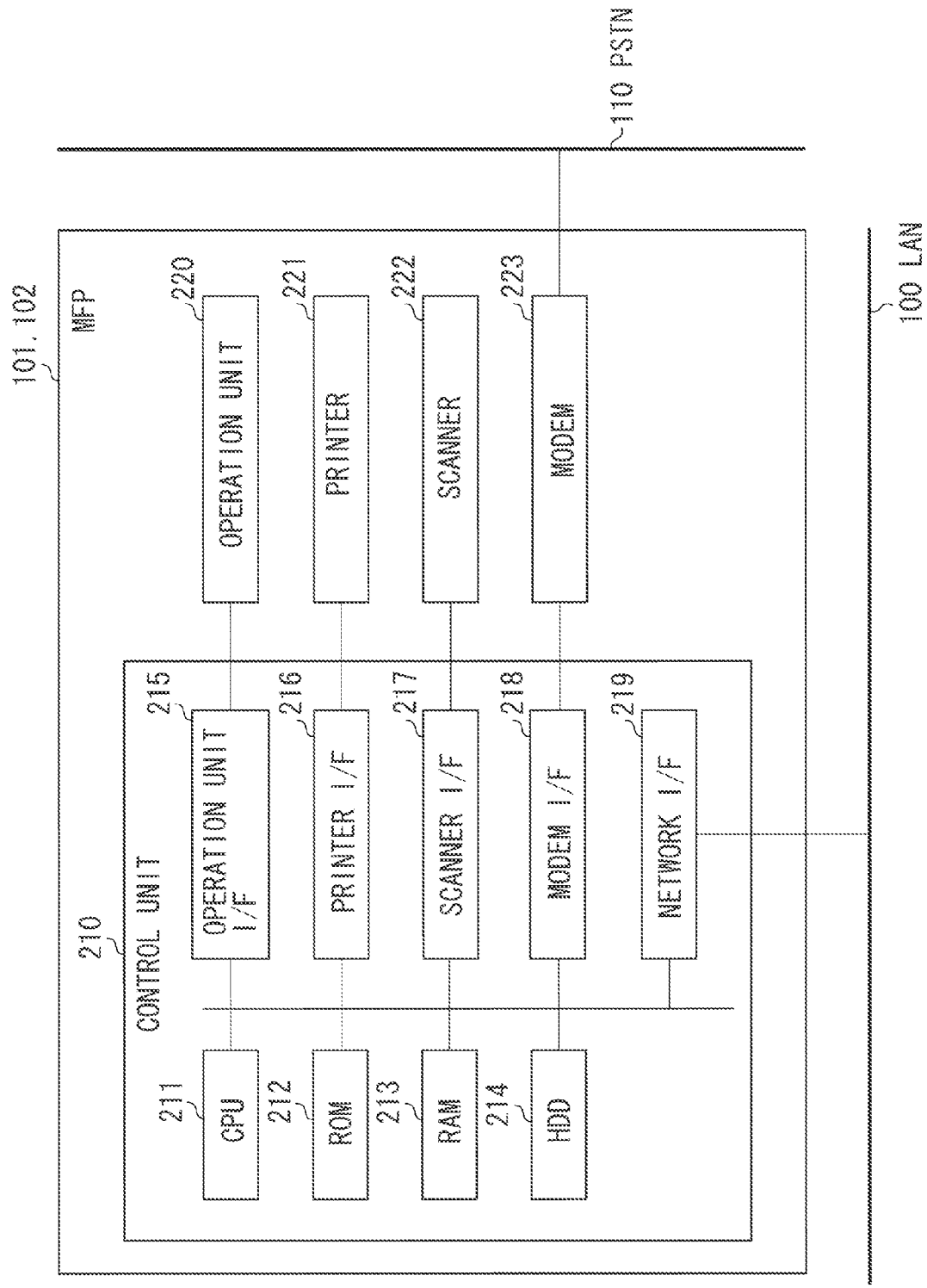
FIG. 2 is a block diagram illustrating a configuration of a multifunction peripheral (MFP) according to the first exemplary embodiment.

FIG. 2 is a block diagram illustrating the configuration of the MFP 101. A control unit 210 includes a central processing unit (CPU) 211, and controls the overall operation of the MFP 101. The CPU 211 reads a control program stored in a read only memory (ROM) 212 and performs various types of control such as reading control and transmitting control. A random access memory (RAM) 213 is used as a temporary storage area such as a main memory or a work area of the CPU 211. Although, in the case of the MFP 101, one CPU 211 uses one memory (RAM 213 or hard disk drive (HDD) 214) to execute each processing illustrated in each of flow charts in FIGS. 6, 10, 12, 14, and 18 which will be described below, another configuration may be used. For example, a plurality of CPUs, and a plurality of RAMs or HDDs may be cooperated to execute each processing illustrated in each of the flow charts in FIGS. 6, 10, 12, 14, and 18.

The HDD 214 stores image data and various programs. An operation unit interface (I/F) 215 connects an operation unit 220 to the control unit 210. The operation unit 220 includes a liquid crystal display unit having a touch panel function and a keyboard.

A printer I/F 216 connects a printer 221 to the control unit 210. Image data to be printed by the printer 221 is transferred from the control unit 210 via the printer I/F 216 and printed on a recording medium by the printer 221.

A scanner I/F 217 connects a scanner 222 to the control unit 210. The scanner 222 reads an image on a document to generate image data (image file) and inputs the image data into the control unit 210 via the scanner I/F 217. The MFP 101 can transmit the image data (image file) generated by the scanner 222 as a file or transmit the image data by e-mail.

A modem I/F 218 connects a modem 223 to the control unit 210. The modem 223 connects the control unit 210 (MFP 101) to the PSTN 110. The modem 223 executes facsimile transmission and reception between the modem 223 and the facsimile machine on the PSTN 110.

A network I/F 219 connects the control unit 210 (MFP 101) to the LAN 100. The network I/F 219 transmits image data and information to an external device (the MFP 102 and the file server 103) on the LAN 100, and receives various types of information from the external device on the LAN 100.

Because the configuration of the MFP 102 is the same as that of the MFP 101, the description thereof will be omitted.

Figure 3:
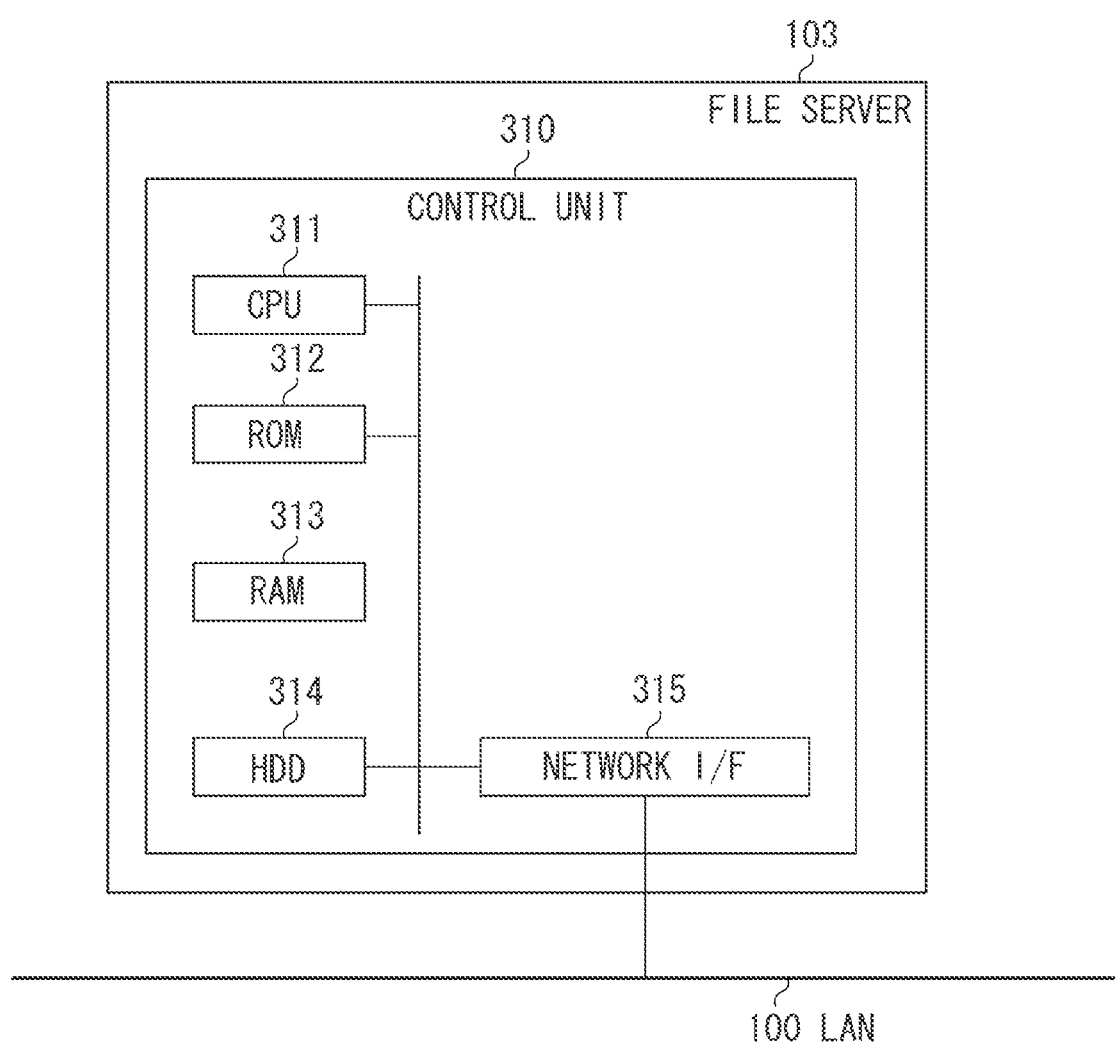
FIG. 3 is a block diagram illustrating a configuration of a file server according to the first exemplary embodiment.

FIG. 3 is a block diagram illustrating the configuration of the file server 103. A control unit 310 includes a CPU 311, and controls the overall operation of the file server 103. The CPU 311 reads a control program stored in a ROM 312 to execute various types of control processing. A RAM 313 is used as a temporary storage area such as a main memory or a work area of the CPU 311. An HDD 314 stores image data and various programs.

A network I/F 315 connects the control unit 310 (file server 103) to the LAN 100. The network I/F 315 transmits and receives various types of information between the control unit 310 and another apparatus on the LAN 100.

FIG. 4 illustrates an example of an operation screen displayed on the operation unit 220. The operation screen illustrated in FIG. 4 is displayed when a destination for file transmission is registered in an address book. Only an authorized user is permitted to register the destination in the address book, and the user is required to input a security code in order to display the screen in FIG. 4.

Information 401 indicates the name of a destination to be registered. Information 402 indicates a transmission protocol used for transmitting the image data. Although the MFP 101 can select one of SMB and FTP, a transmission protocol other than SMB and FTP may be included as an option. For example, the WebDAV (World Wide Web Distributed Authoring and Versioning) protocol can be included. A user can select a desired transmission protocol from options displayed in a drop-down form.

Information 403 (a host name) and information 404 (a path) are used for specifying a folder as a destination of the image data. Information 405 (a user name) and information 406 (a password) are used as authentication information required for accessing the folder specified by the information 403 and information 404.

Operation keys 407 and 408 select ON or OFF in "Input required at transmission". When "ON" is selected by the operation key 407, a screen for inputting the authentication information (the user name and the password) is displayed after transmission execution is instructed (a start button is pressed). When "OFF" is selected by the operation key 408, the image data is transmitted by using the authentication information registered as the information 405 and information 406 without the screen for inputting the authentication information (the user name and the password) being displayed.

FIG. 5 illustrates a destination management table 500 (address book) stored in the HDD 214. Destination information input via the screen in FIG. 4 is distinguished for each destination, and is managed by the destination management table 500. Information 501 uniquely indicates the destination managed by the destination management table 500. Information 502 to information 507 respectively correspond to the information 401 to information 406 illustrated in FIG. 4. Information 508 indicates the result of the selection performed by using the operation keys 407 and 408 in FIG. 4. When the operation key 407 is operated, ON is stored. When the operation key 408 is operated, OFF is stored.

Figure 6:
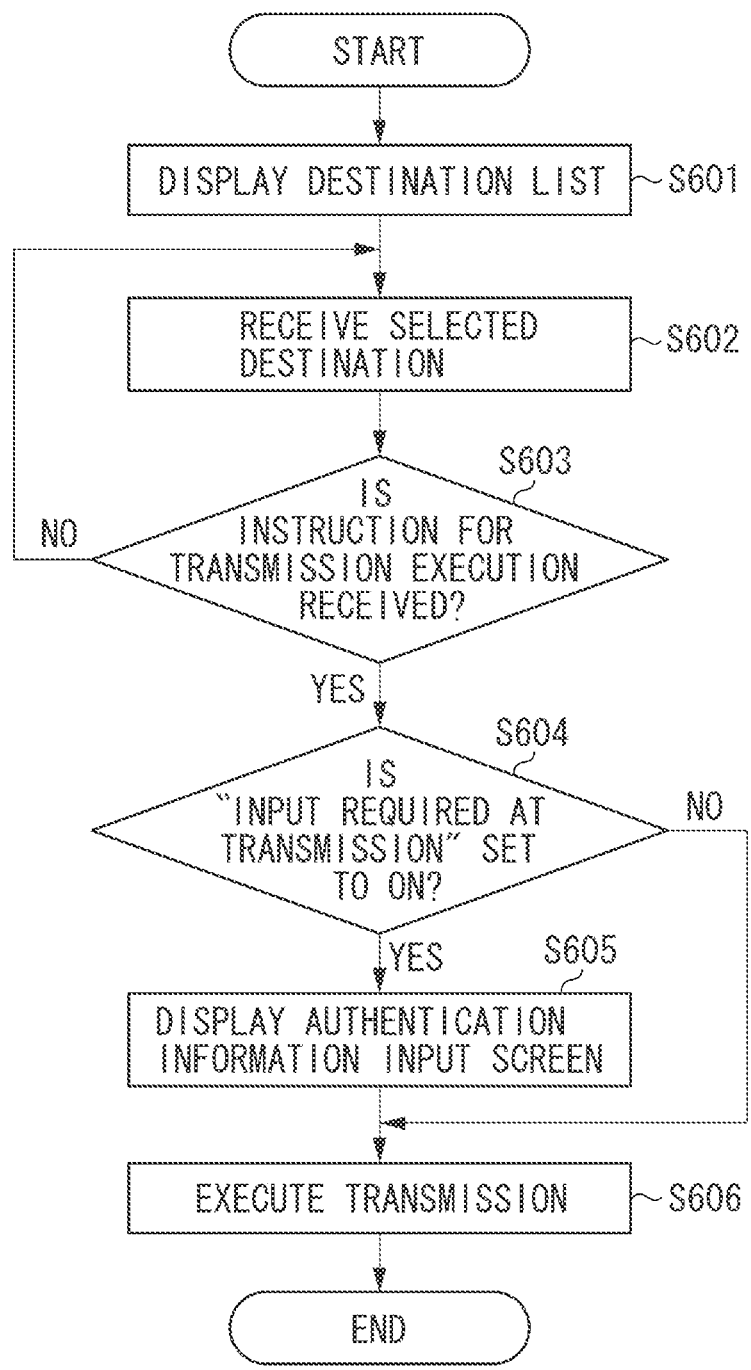
FIG. 6 is a flow chart illustrating an operation of the MFP according to the first exemplary embodiment.

FIG. 6 is a flow chart illustrating an operation for selecting the destination registered in the address book and transmitting the image data as a file. The CPU 211 of the MFP 101 executes a control program stored in the HDD 214 to realize operations (steps) illustrated in the flow chart in FIG. 6.

In step S601, the CPU 211 displays a destination list according to an instruction from the user. As the content of the address book illustrated in FIG. 5, "Suzuki", "Tanaka", "Sato", "Kato", and "Yamada" are displayed on a destination list screen. In step S602, the CPU 211 receives a destination selected by the user. In step S603, the CPU 211 determines whether the instruction for the transmission execution is received from the user (the start button is pressed). When it is determined that the instruction for the transmission execution is received, the processing proceeds to step S604. When it is determined that the instruction for the transmission execution is not received, the processing returns to step S602.

In step S604, the CPU 211 determines whether "Input required at transmission" of the destination selected by the user is set to ON. When it is determined that "Input required at transmission" is set to ON, the processing proceeds to step S605 to display an authentication information input screen (illustrated in FIG. 7).

FIG. 7 illustrates an example of the operation screen displayed on the operation unit 220. When "Input required at transmission" of the destination selected by the user is set to ON, the operation screen illustrated in FIG. 7 is displayed.

Information 701 indicates the transmission protocol selected as the information 402 in FIG. 4. Information 702 indicates the host name input as the information 403 in FIG. 4. Information 703 indicates the path input as the information 404 in FIG. 4. Because the information 701 to information 703 cannot be changed on a confirmation screen in FIG. 7, the information 701 to information 703 are displayed with hatched lines.

Information 704 and information 705 correspond to the information 405 (a user name) and information 406 (a password) in FIG. 4, and are used as authentication information required for accessing the folder specified by the information 702 and information 703. Because the information 704 and information 705 are displayed in a blank state on the screen in FIG. 7, the user needs to input the information 704 and information 705. Thus, by setting "Input required at transmission" to ON, the user can input the authentication information every time when transmitting the image data. This can prevent a user who cannot know the authentication information from performing the unauthorized file transmission using authentication information registered by the other user by referring to the address book.

When the user who inputs the information 704 and information 705 presses an OK button or a start button which is not illustrated, the processing proceeds to step S606. When it is determined that "Input required at transmission" is set to OFF in step S604, the processing skips step S605, and proceeds to step S606. Because the time and effort for the user for inputting the authentication information are eliminated in this case, the file transmission can be performed by a simple operation.

In step S606, the CPU 211 executes the file transmission of the image data. In a case where the scanner 222 reads the document and the CPU 211 transmits the generated image data, the CPU 211 reads the document in step S606. As specific processing for the file transmission, the image processing apparatus is connected to the file server 103 corresponding to the host name of the information 702 in FIG. 7 by the transmission protocol of the information 701, and login to the file server 103 (access to the folder) is performed by using the authentication information of the information 704 and information 705. When the login to the file server 103 is successful, the image data is transmitted to the file server 103 (stored in the folder indicated by the information 703).

Next, transfer setting for automatically transferring the image data received by the MFP 101 to a previously-set transfer destination will be described. FIG. 8 illustrates an example of the operation screen displayed on the operation unit 220. The operation screen illustrated in FIG. 8 is displayed when the transfer setting is performed. Only an authorized user is permitted to register the transfer setting, and the user is required to input a security code in order to display the screen in FIG. 8.

Information 801 indicates a method to receive image data to execute transfer. The MFP 101 can receive the image data via facsimile or I facsimile, and the user can select a desired receiving method from options displayed in a drop-down form.

Information 802 indicates a condition to receive image data to execute transfer. When the facsimile is selected in the information 801, for example, a condition "Received from 03-1234-5678" can be set in the information 802. In this case, when the image data is received from an apparatus having a facsimile number 03-1234-5678, the transfer of the image data is executed. When the I facsimile is selected in the information 801, for example, a condition "Received from aaa@bbb.co.jp" can be set.

Figure 9:
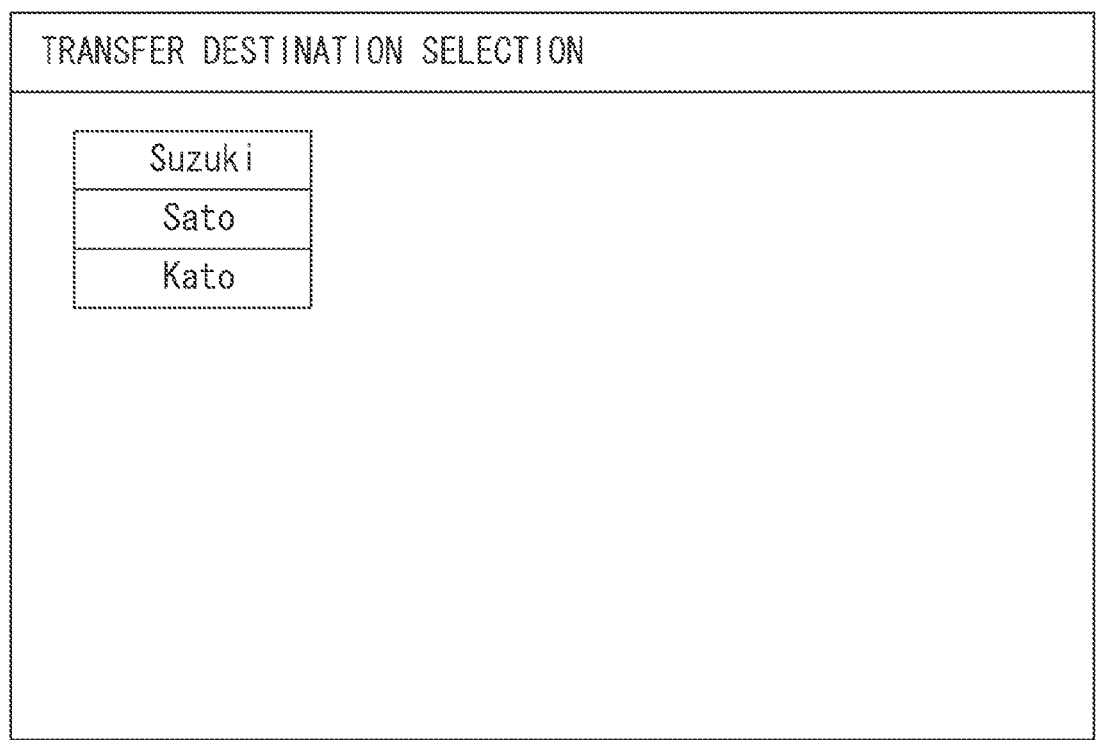
FIG. 9 illustrates an operation screen of the MFP according to the first exemplary embodiment.

Information 803 indicates a transfer destination of the image data. When the user touches an input column of the information 803, a transfer destination selection screen illustrated in FIG. 9 is displayed. FIG. 9 illustrates an example of the operation screen displayed in the operation unit 220. Only a destination which can be selected as a transfer destination of the image data is displayed on the screen in FIG. 9. A destination which should not be selected as a transfer destination is not displayed, even if the destination is registered in the address book.

Figure 10:
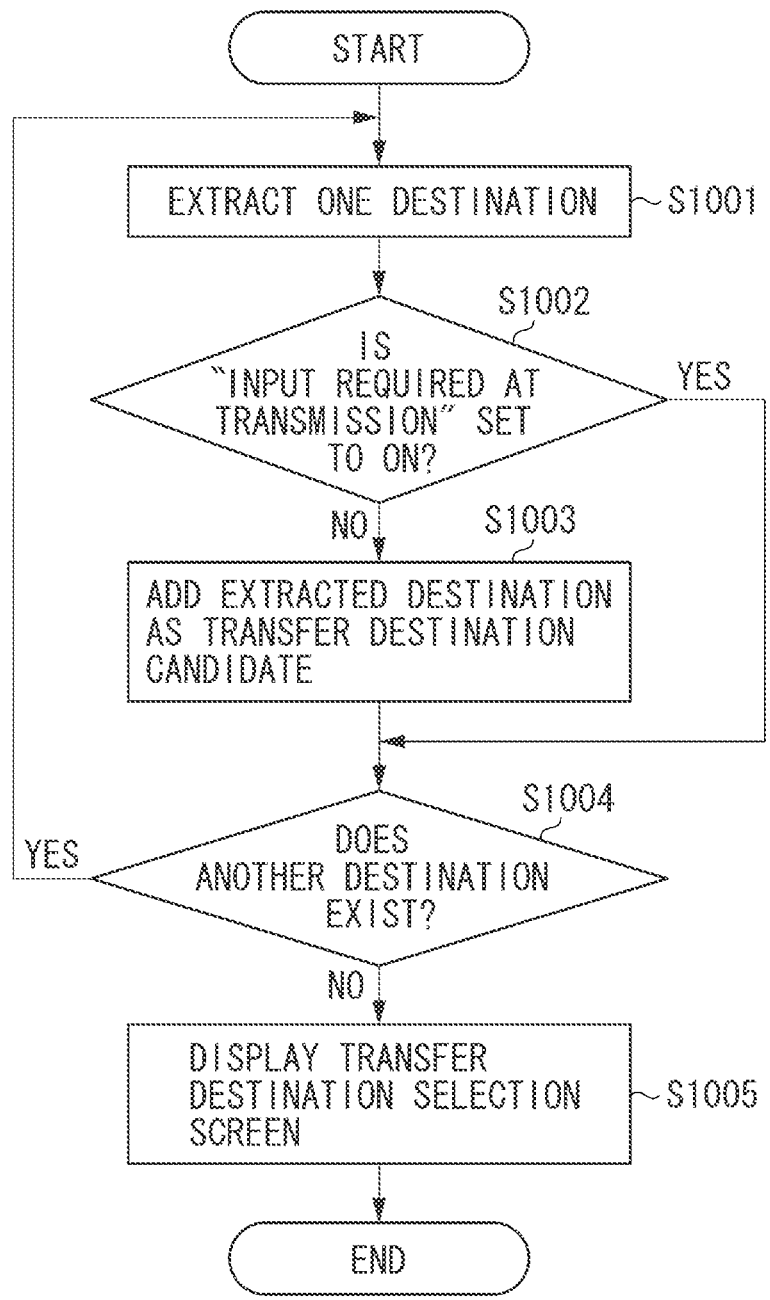
FIG. 10 is a flow chart illustrating an operation of the MFP according to the first exemplary embodiment.

FIG. 10 is a flow chart illustrating an operation for displaying the transfer destination selection screen. The CPU 211 of the MFP 101 executes a control program stored in the HDD 214 to realize operations (steps) illustrated in the flow chart in FIG. 10. The flow chart in FIG. 10 is started when the user touches the input column of the information 803.

In step S1001, the CPU 211 extracts one destination managed by the destination management table 500. In step S1002, the CPU 211 determines whether "Input required at transmission" is set to ON with reference to the information 508 of the extracted destination. When it is determined that "Input required at transmission" is not set to ON, the processing proceeds to step S1003 to add the extracted destination as a transfer destination candidate. On the other hand, when it is determined that "Input required at transmission" is set to ON, the CPU 211 skips step S1003, and the processing proceeds to step S1004. That is, the extracted destination is not added as a transfer destination candidate.

In step S1004, the CPU 211 determines whether another destination exists in the destination management table 500. When the destination exists, the processing returns to step S1001. When the destination does not exist, the processing proceeds to step S1005. In step S1005, the CPU 211 displays a list of transfer destination candidates (illustrated in FIG. 9). Because "Input required at transmission" is set to OFF in "Suzuki", "Sato", and "Kato" in the destination management table 500 in FIG. 5, "Suzuki", "Sato", and "Kato" are displayed as transfer destination candidates on the screen in FIG. 9. On the other hand, because "Input required at transmission" is set to ON in "Tanaka" and "Yamada", "Tanaka" and "Yamada" are not displayed on the screen in FIG. 9. The transfer destination selected by the user via the screen in FIG. 9 is set as the information 803 in FIG. 8.

Thus, in the present exemplary embodiment, the CPU 211 displays the destination for which "Input required at transmission" is set to OFF on the screen for selecting the transfer destination, and does not display the destination for which "Input required at transmission" is set to ON. This can prevent the destination for which "Input required at transmission" is set to ON from being selected as a transfer destination. In other words, this can prevent the screen in FIG. 7 from being displayed when the user is absent, and the received image data from being left suspended without being transferred. Herein, the exemplary embodiment in which the destination for which "Input required at transmission" is set to ON is displayed has been described. However, the destination for which "Input required at transmission" is set to ON may be displayed in an unselectable state.

Referring back to the description on FIG. 8, information 804 indicates whether the transfer setting is enabled or disabled. When the information 804 is enabled, the automatic transfer of the image data to the transfer destination indicated by the information 803 is executed when the image data is received with the information 802 satisfied. When the information 804 is disabled, the transfer of the image data is not executed even if the image data is received with the information 802 satisfied. When the user desires to temporarily stop the transfer of the image data, the user disables the information 804.

FIG. 11 illustrates a transfer setting management table 1100 stored in the HDD 214. The destination information input via the screen in FIG. 8 is managed by the transfer setting management table 1100. Information 1101 uniquely indicates the transfer setting managed by the transfer setting management table 1100. Information 1102 to information 1105 respectively correspond to the information 801 to information 804 illustrated in FIG. 8.

Figure 12:
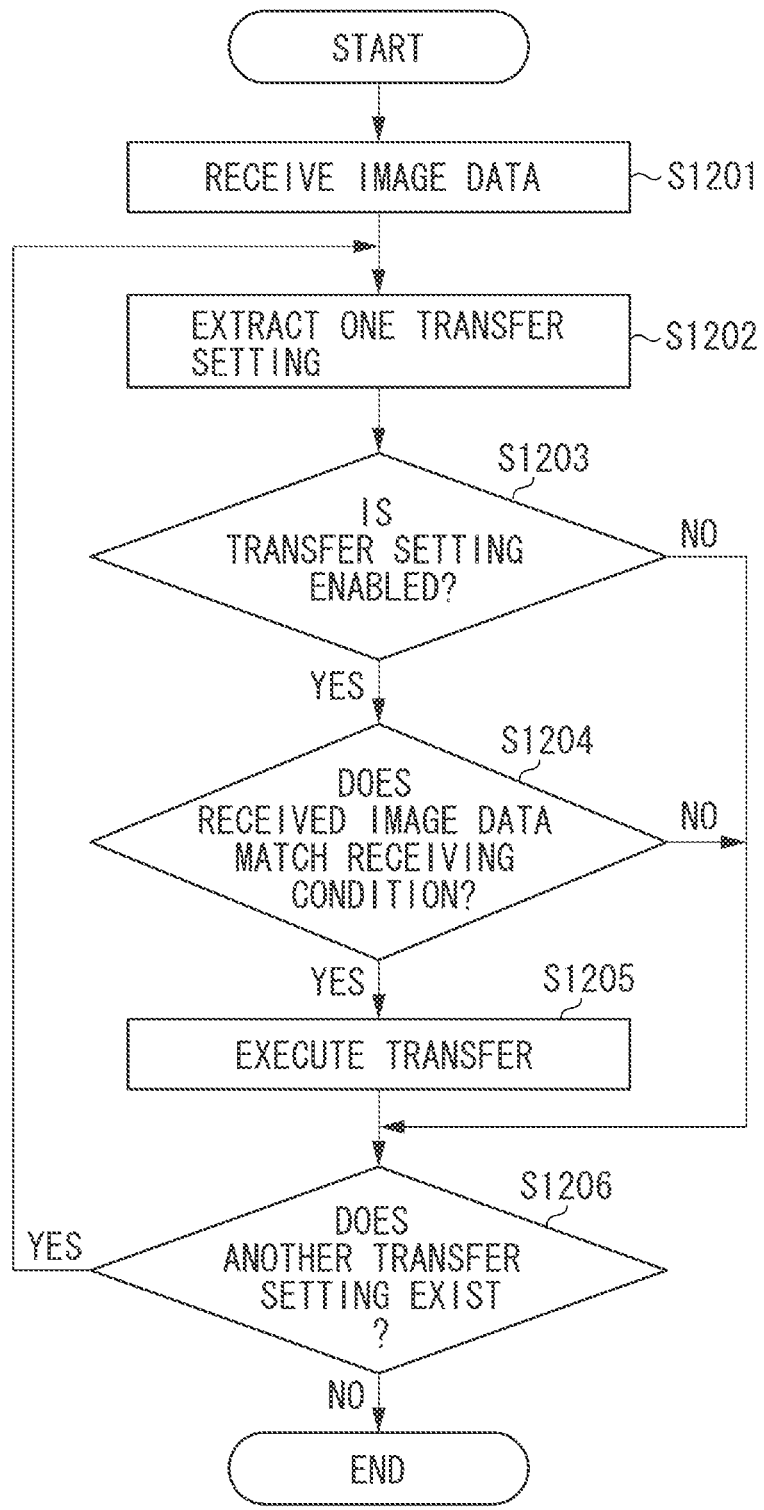
FIG. 12 is a flow chart illustrating an operation of the MFP according to the first exemplary embodiment.

FIG. 12 is a flow chart illustrating an operation for transferring the received image data. The CPU 211 of the MFP 101 executes a control program stored in the HDD 214 to realize operations (steps) illustrated in the flow chart in FIG. 12.

In step S1201, the CPU 211 receives the image data. In step S1202, the CPU 211 extracts one transfer setting managed by the transfer setting management table 1100. In step S1203, the CPU 211 determines whether the transfer setting is enabled with reference to the information 1105 of the extracted transfer setting. When it is determined that the transfer setting is enabled, the processing proceeds to step S1204. When it is determined that the transfer setting is disabled, the processing proceeds to step S1206.

In step S1204, the CPU 211 determines whether the image data received in step S1201 matches the condition of information 1103 with reference to the information 1103 of the extracted transfer setting. When it is determined that the image data received in step S1201 matches the condition of the information 1103, the processing proceeds to step S1205. Otherwise, the processing proceeds to step S1206.

In step S1205, the CPU 211 executes transfer according to the file transmission of the image data received in step S1201. As the specific processing of the file transmission, the image processing apparatus is connected to the file server 103 corresponding to the host name of the information 504 in FIG. 5 by the transmission protocol of the information 503, and performs login (access to the folder) to the file server 103 using the authentication information of the information 506 and information 507. When the login to the file server 103 is successful, the image data is transmitted to the file server 103 (stored in the folder illustrated by information 505).

In step S1206, the CPU 211 determines whether another transfer setting exists in the transfer setting management table 1100. When the transfer setting exists, the processing returns to step S1202. When the transfer setting does not exist, the processing is ended.

Next, a second exemplary embodiment of the present invention will be described. When a destination registered in an address book is edited in the second exemplary embodiment, the setting of "Input required at transmission" for a destination referred to by transfer setting (specified as a transfer destination) is not to be changed from OFF to ON.

The detailed description for the same configuration as that of the above-mentioned first exemplary embodiment will be omitted.

FIG. 13 corresponds to FIG. 5, and illustrates a destination management table 1300 (address book) stored in an HDD 214. Information 501 to information 508 are the same as those described in FIG. 5. When FIG. 5 is compared with FIG. 13, it is found that information 1301 is added to FIG. 13.

The information 1301 indicates the number of references in each destination made by the transfer setting. For example, in the example illustrated in FIG. 11, the transfer destination is set to "Suzuki" in transfer settings 001, 002, and 004. That is, "Suzuki" is referred to by three transfer settings, and the value of the information 1301 is set to 3. Similarly, the transfer destination is set to "Kato" in transfer settings 003 and 005. That is, "Kato" is referred to by two transfer settings, and the value of the information 1301 is set to 2. On the other hand, because "Tanaka", "Sato", and "Yamada" are not referred from any of the transfer settings, the value of the information 1301 is set to 0.

FIG. 14 is a flow chart illustrating an operation for editing the destination registered in the address book. The CPU 211 of the MFP 101 executes a control program stored in the HDD 214 to realize operations (steps) illustrated in the flow chart in FIG. 14. Only an authorized user is permitted to edit the destination of the address book, and the user is required to input a security code in order to start the flow chart in FIG. 14.

In step S1401, the CPU 211 displays a destination list according to an instruction from a user. As the content of the address book illustrated in FIG. 13, the CPU 211 displays "Suzuki", "Tanaka", "Sato", "Kato", and "Yamada" on a destination list screen. In step S1402, the CPU 211 receives the destination selected by the user.

In step S1403, the CPU 211 determines, with reference to the information 1301, whether the number of references of the destination selected by the user is a value greater than 0. When it is determined that the number of references is a value greater than 0, the processing proceeds to step S1405. When it is determined that the number of references is not a value greater than 0 (when the number of references is 0), the processing proceeds to step S1404.

FIG. 15 illustrates an example of an operation screen displayed on an operation unit 220. A destination editing screen illustrated in FIG. 15 is displayed in step S1404. Information 1501 to information 1508 in FIG. 15 respectively correspond to the information 401 to information 408 in FIG. 4. The user can change the contents of the information 1501 to information 1508 via the screen in FIG. 15.

FIG. 16 illustrates an example of an operation screen displayed on the operation unit 220. A destination editing screen illustrated in FIG. 16 is displayed in step S1405. Information 1501 to information 1506 in FIG. 16 respectively correspond to the information 1501 to information 1506 in FIG. 15. The user can change the contents of the information 1501 to information 1506 via the screen in FIG. 16.

However, although ON or OFF of "Input required at transmission" can be selected in the screen in FIG. 15, an operation key 1507 is not displayed on the screen in FIG. 16, and ON of "Input required at transmission" cannot be selected. Thus, the setting of "Input required at transmission" for the destination referred to by the transfer setting is not to be changed from OFF to ON.

In step S1406, the CPU 211 determines whether the editing of destination setting via the screen in FIG. 15 or 16 is completed. When it is determined that the editing is completed, the processing proceeds to step S1407. In step S1407, the CPU 211 updates the content of the destination management table 1300 according to an instruction from the user via the screen in FIG. 15 or 16.

Next, a third exemplary embodiment of the present invention will be described. In the third exemplary embodiment, when the setting of "Input required at transmission" for a destination registered in an address book is changed from OFF to ON, transfer setting that refers to the destination is changed to be disabled. The detailed description of the same configuration as that of the above-mentioned first exemplary embodiment will be omitted.

FIG. 17 corresponds to FIG. 5, and illustrates a destination management table 1700 (address book) stored in an HDD 214. Information 501 to information 508 are the same as those described in FIG. 5. When FIG. 5 is compared with FIG. 17, it is found that information 1701 is added to FIG. 17.

The information 1701 indicates transfer setting identification (ID) that refers to each destination. For example, because the transfer destination is set to "Suzuki" in transfer settings 001, 002, and 004 in the example illustrated in FIG. 11, the transfer settings 001, 002, and 004 are stored in the information 1701 of "Suzuki". Similarly, because the transfer destination is set to "Kato" in transfer settings 003 and 005, the transfer settings 003 and 005 are stored in the information 1701 of "Kato". On the other hand, because "Tanaka", "Sato", and "Yamada" are not referred from any of the transfer settings, the information 1701 is blank.

Figure 18:
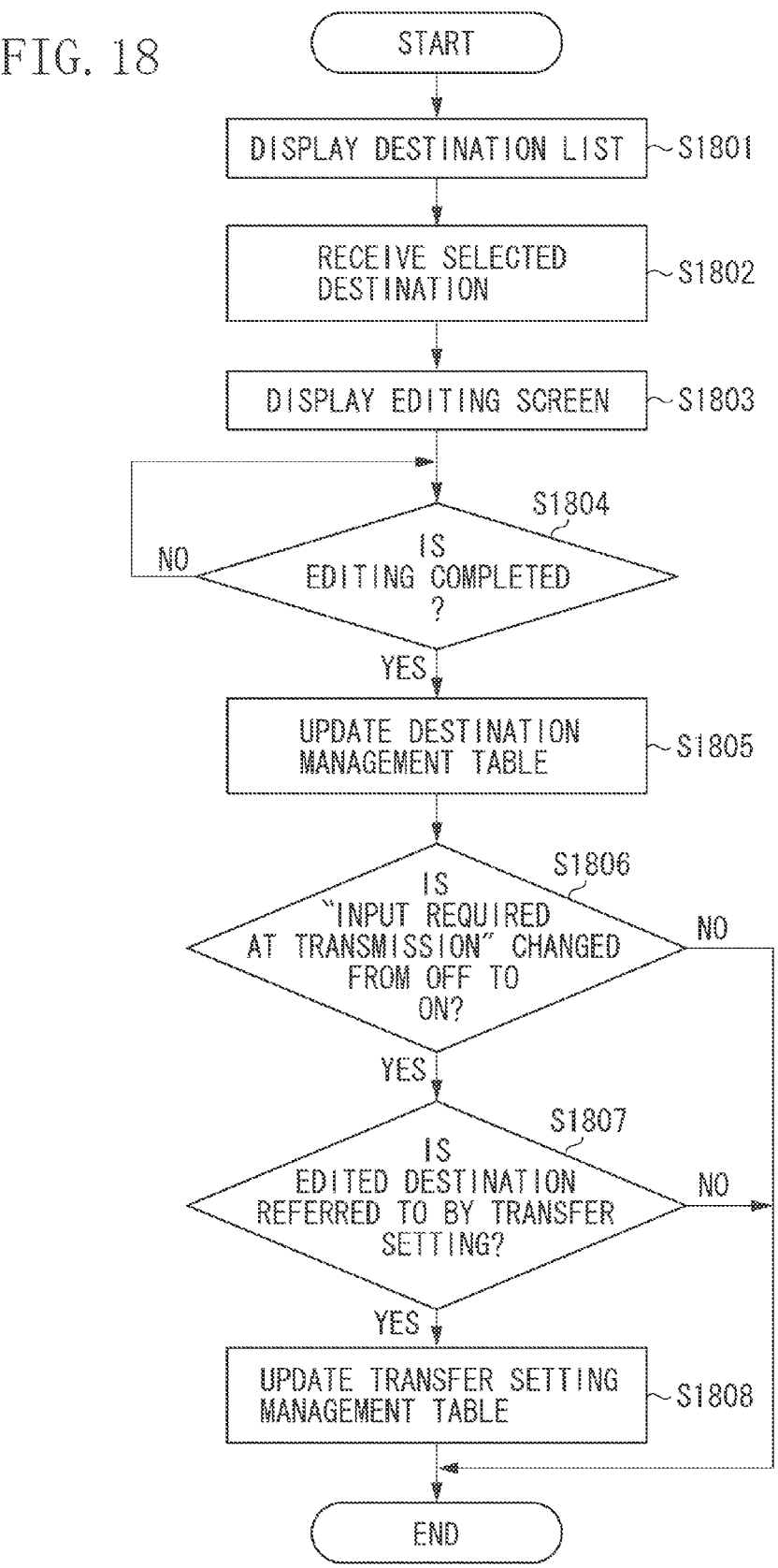
FIG. 18 is a flow chart illustrating an operation of an MFP according to the third exemplary embodiment.

FIG. 18 is a flow chart illustrating an operation for editing the destination registered in the address book. The CPU 211 of the MFP 101 executes a control program stored in the HDD 214 to realize operations (steps) illustrated in the flow chart in FIG. 18. Only an authorized user is permitted to edit the destination of the address book, and the user is required to input a security code in order to start the flow chart in FIG. 18.

In step S1801, the CPU 211 displays a destination list according to an instruction from a user. As the content of the address book illustrated in FIG. 17, "Suzuki", "Tanaka", "Sato", "Kato", and "Yamada" are displayed on a destination list screen. In step S1802, the CPU 211 receives the destination selected by the user.

In step S1803, the CPU 211 displays a destination editing screen illustrated in FIG. 15. In step S1804, the CPU 211 determines whether the editing of destination setting via the screen in FIG. 15 is completed. When it is determined that the editing is completed, the processing proceeds to step S1805. In step S1805, the CPU 211 updates the content of the destination management table 1700 according to an instruction from the user via the screen in FIG. 15.

In step S1806, the CPU 211 determines whether the setting of "Input required at transmission" is changed from OFF to ON by the editing. When it is determined that the setting of "Input required at transmission" is changed from OFF to ON by the editing, the processing proceeds to step S1807. Otherwise, the processing is ended.

In step S1807, the CPU 211 determines whether the edited destination is referred to by the transfer setting. When it is determined that the edited destination is referred to by the transfer setting, the processing proceeds to step S1808. Otherwise, the processing is ended. When the edited destination is set to "Suzuki" or "Kato" in the example in FIG. 17, the processing proceeds to step S1808.

In step S1808, the transfer setting that refers to the edited destination is changed to be disabled. When the edited destination is set to "Suzuki" in the example in FIG. 11, the transfer settings 001, 002, and 004 are changed to be disabled. Thus, the transfer setting that refers to the destination with "Input required at transmission" being set to ON is to be disabled. This can prevent the screen in FIG. 7 from being displayed when the user is absent.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A data processing apparatus comprising:
   a scanning unit configured to scan a document and generate data of the document;
   a receiving unit configured to receive data;
   a registration unit configured to register a plurality of destinations in an address book;
   a transmission unit configured to transmit data generated by the scanning unit to a destination set from the plurality of destinations and to transmit data received by the receiving unit to a destination set from the plurality of destinations;
   a selection unit configured to select, for a destination of the plurality of destinations, whether to display, when transmitting the data to the destination, an input screen for receiving authentication information from a user or to use, without displaying the input screen when transmitting the data to the destination, authentication information registered for the destination registered by the registration unit; and
   a display unit configured to display the input screen in a case where the transmitting unit transmits the data generated by the scanning unit to the destination for which the selecting unit selects to display the input screen for receiving authentication information from the user,
   wherein the transmitting unit transmits the data generated by the scanning unit using the authentication information input by the input screen,
   wherein the registration unit can register the authentication information for the destination for which the selecting unit selects to use the authentication information registered by the registration unit,
   wherein the scan data and the received data are transmitted to the destination using the registered authentication information by the transmitting unit based on the selection to use the registered authentication information, and
   wherein the destination for which the selecting unit selects to display the input screen for receiving authentication information from the user cannot be set as a destination of the data received by the receiving unit.

2. The data processing apparatus according to claim 1, wherein the receiving unit is a facsimile data receiving unit configured to receive facsimile data, wherein the data received by the receiving unit is the facsimile data received by the facsimile data receiving unit.

3. A data processing apparatus comprising:
   a scanning unit configured to scan a document and generate data of the document;
   a receiving unit configured to receive data;
   a registration unit configured to register a plurality of destinations in an address book;
   a transmission unit configured to transmit data generated by the scanning unit to a destination set from the plurality of destinations and to transmit data received by the receiving unit to a destination set from the plurality of destinations;
   a selection unit configured to select, for a destination of the plurality of destinations, whether to display, when transmitting the data to the destination, an input screen for receiving authentication information from a user or to use, without displaying the input screen when transmitting the data to the destination, authentication information registered for the destination registered by the registration unit,
   wherein the registration unit can register the authentication information for the destination for which the selecting unit selects to use the authentication information registered by the registration unit,
   wherein the scan data and the received data are transmitted to the destination using the registered authentication information by the transmitting unit based on the selection to use the registered authentication information,
   wherein the destination for which the selecting unit selects to display the input screen for receiving authentication information from the user cannot be set as a destination of the data received by the receiving unit, and
   wherein the transmitting unit is able to transmit the data by using at least one of Server Message Block (SMB) Protocol, File Transfer Protocol (FTP), or World Wide Web Distributed Authoring and Versioning (WebDAV) Protocol.

4. A method for controlling a data processing apparatus, the method comprising:
   registering, in an address book memory, a plurality of destinations;
   transmitting data generated by a scanning unit to a destination set from the plurality of destinations registered in the memory and transmitting received data to a destination set from the plurality of destinations registered in the memory;
   selecting, for a destination of the plurality of destinations, whether to display, when transmitting the data to the destination, an input screen for receiving authentication information from a user or to use, without displaying the input screen when transmitting the data to the destination, authentication information registered for the destination; and displaying the input screen in a case where the data generated by the scanning unit is transmitted to the destination for which the selecting unit selects to display the input screen for receiving authentication information from the user, wherein the data generated by the scanning unit is transmitted using the authentication information input by the input screen, wherein the authentication information can be registered for the destination for which it is selected to use the registered authentication information, wherein the scan data and the received data are transmitted to the destination using the registered authentication information based on the selection to use the registered authentication information, and wherein the destination for which the it is selected to display the input screen for receiving authentication information from the user cannot be set as a destination of the received data.

5. A non-transitory computer readable storage medium for storing a set of computer executable instructions that perform a method of controlling a data processing apparatus, the method comprising:

registering, in an address book memory, a plurality of destinations;

transmitting data generated by a scanning unit to a destination set from the plurality of destinations registered in the memory and transmitting received data to a destination set from the plurality of destinations registered in the memory; and selecting, for a destination of the plurality of destinations, whether to display, when transmitting the data to the destination, an input screen for receiving authentication information from a user or to use, without displaying the input screen when transmitting the data to the destination, authentication information registered for the destination, displaying the input screen in a case where the data generated by the scanning unit is transmitted to the destination for which the selecting unit selects to display the input screen for receiving authentication information from the user, wherein the data generated by the scanning unit is transmitted using the authentication information input by the input screen, wherein the authentication information can be registered for the destination for which it is selected to use the registered authentication information, wherein the scan data and the received data are transmitted to the destination using the registered authentication information based on the selection to use the registered authentication information, and wherein the destination for which it is selected to display the input screen for receiving authentication information from the user cannot be set as a destination of the received data.

* * * * *